United States Patent
Li et al.

(10) Patent No.: US 12,459,152 B2
(45) Date of Patent: Nov. 4, 2025

(54) FILM TEARING MACHINE AND FILM TEARING METHOD

(71) Applicant: RI SHAN COMPUTER ACCESSORY (JIASHAN) CO., LTD., Jiaxing (CN)

(72) Inventors: Jianglong Li, Jiaxing (CN); Mingyang Huang, Jiaxing (CN); Kai Li, Jiaxing (CN)

(73) Assignee: RI SHAN COMPUTER ACCESSORY (JIASHAN) CO., LTD., Jiaxing (CN)

( * ) Notice: Subject to any disclaimer, the term of this patent is extended or adjusted under 35 U.S.C. 154(b) by 390 days.

(21) Appl. No.: 18/092,923

(22) Filed: Jan. 3, 2023

(65) Prior Publication Data
US 2023/0145858 A1    May 11, 2023

Related U.S. Application Data

(63) Continuation of application No. PCT/CN2022/099290, filed on Jun. 17, 2022.

(30) Foreign Application Priority Data

Oct. 29, 2021    (CN) .......................... 202111270572.8

(51) Int. Cl.
*B26F 3/02*    (2006.01)
*B26D 7/01*    (2006.01)

(52) U.S. Cl.
CPC ................ *B26F 3/02* (2013.01); *B26D 7/018* (2013.01)

(58) Field of Classification Search
CPC .................................. B62F 3/02; B26D 7/018
See application file for complete search history.

(56) References Cited

U.S. PATENT DOCUMENTS

2014/0150980 A1*    6/2014    Itou .................... H01L 21/67132
156/761

* cited by examiner

*Primary Examiner* — Liang Dong
(74) *Attorney, Agent, or Firm* — Hemisphere Law, PLLC; Zhigang Ma

(57) ABSTRACT

A film tearing machine and a film tearing method are provided. The film tearing machine solves problems, such as unreasonable design. The film tearing machine includes a bottom plate; a film tearing flattening feeding mechanism fixed on the bottom plate for a flat output of a release film; a film delivering mechanism horizontally and slidably connected to the bottom plate for undertaking the flat release film output by the film tearing flattening feeding mechanism and translating the flat release film to a preset tearing position; and an upward peeling mechanism disposed above the preset tearing position for peeling the release film upward. The film tearing machine ensures flatness of the release film during feeding and stability of fixation during peeling.

8 Claims, 5 Drawing Sheets

FILM TEARING MACHINE AND FILM TEARING METHOD

TECHNICAL FIELD

The disclosure relates to a field of release film tearing technologies, and more particularly to a film tearing machine and a film tearing method.

BACKGROUND

Release films are widely used in various electric devices. It is important to test peeling force of the release films, which is performed by a film tearing machine. In existing film tearing machines, for example, the film tearing machine is provided by an application to the China National Intellectual Property Administration, the publication number of which is CN202021202526.5, including: a first base, a second base, a first guide rail assembly, a second guide rail assembly, a lower vacuum suction, an upper cylinder, a first locking shaft assembly, a second locking shaft assembly, an upper bracket, an upper vacuum suction, a lower cylinder, a second cylinder and a cutting device. An upper cylinder base is mounted between the first base and the second base; the upper cylinder is fixedly mounted on the top of the upper cylinder base; the lower vacuum suction is fixedly mounted on a piston rod of the upper cylinder; and the first guide rail assembly is fixedly mounted on the top of the first base.

The above-mentioned solution can achieve tearing the film, however, feeding and delivering of the above-mentioned solution are difficult to ensure the flatness of the release film before tearing, as well as the fixation of the release film when tearing, which eventually leads to creases during peeling and a failure in testing the peeling force.

SUMMARY

An object of the disclosure is to provide a film tearing machine and a film tearing method to solve the above problems.

In order to achieve the above objective, the disclosure provides a technical solution as follows.

The disclosure provides a film tearing machine including a bottom plate; a film tearing flattening feeding mechanism disposed on the bottom plate, which is used to output a release film flatly; a film delivering mechanism horizontally and slidably connected to the bottom plate, which is used to undertake and translate the flat release film output by the film tearing flattening feeding mechanism to a preset film tearing position; and an upward peeling mechanism disposed above the preset film tearing position, which is used to peel the release film upward.

In the above described film tearing machine, the film delivering mechanism is a downward negative pressure adsorption-type film delivering mechanism and the upward peeling mechanism is an upward negative pressure adsorption-type upward peeling mechanism.

In the above described film tearing machine, the film tearing flattening feeding mechanism and the film delivering mechanism are together used to enable the release film to be located on a same horizontal plane.

In the above described film tearing machine, the film tearing flattening feeding mechanism includes: a feeding carrier plate, which is fixed horizontally; and two cantilever-type feeding lock plate assemblies. An outside lower surface of one of the two cantilever-type feeding lock plate assemblies is disposed on a side in a width direction of an upper surface of the feeding carrier plate; a first film side gap is defined between an inner lower surface of the one cantilever-type feeding lock plate assembly and the upper surface of the feeding carrier plate; and an outside lower surface of the other of the two cantilever-type feeding lock plate assemblies is disposed on another side in the width direction of the upper surface of the feeding carrier plate; a second film side gap is defined between an inner lower surface of the other cantilever-type feeding lock plate assembly and the upper surface of the feeding carrier plate.

In the above described film tearing machine, the film tearing flattening feeding mechanism further includes a clump weight, transversely disposed above the upper surface of the feeding carrier plate; and two ends of the clump weight are disposed on upper surfaces of suspended sides of the two cantilever-type feeding lock plate assemblies.

In the above described film tearing machine, each of the two cantilever-type feeding lock plate assemblies includes: an outside fixed lock plate, an inner movable lock plate, and hinge pieces connected between the outside fixed lock plate and the inner movable lock plate. The outside fixed lock plate is fixed on a corresponding side of the upper surface of the feeding carrier plate; one of the first film side gap and the second film side gap is defined between a lower surface of the inner movable lock plate and the upper surface of the feeding carrier plate; and each of the two ends of the clump weight is disposed on a flattened upper surface of the corresponding inner movable lock plate.

In the above described film tearing machine, a position limiting through hole is defined between opposite sides of the outside fixed lock plate and the inner movable lock plate when it is flattened; a first position adjustment counter bore is disposed on the upper surface of the feeding carrier plate in its width direction, and the first position adjustment counter bore is just below the position limiting through hole; a size of the first position adjustment counter bore in the width direction of the feeding carrier plate is larger than that of the position limiting through hole; a position adjustment limiting block is mounted in the first position adjustment counter bore and the position adjustment limiting block extends to the position limiting through hole upward; and the position adjustment limiting block is capable of moving relative to the first position adjustment counter bore in the width direction of the feeding carrier plate to achieve the purpose of position adjustment. Position adjustment fastening structures for adjusting the distance between the two inner movable lock plates are disposed between the outside fixed lock plates and the feeding carrier plate.

In the above described film tearing machine, the film delivering mechanism is a downward negative pressure adsorption-type film delivering mechanism, including: a film delivering carrier plate capable of sliding horizontally; a downward negative pressure adsorption hole area disposed in a middle area of the film delivering carrier plate along a feeding direction; two delivering fixed lock plates correspondingly disposed on two sides of an upper surface of the film delivering carrier plate, which are disposed on a same horizontal plane and are parallel to each other; and two delivering movable lock plates, hinged with inner sides of the two delivering fixed lock plates respectively, each of which is capable of being turned upward and folded on an upper surface of the corresponding delivering fixed lock plate, and capable of being turned downward to form a flattened state leveling to the corresponding delivering fixed lock plate; and a film side gap is defined between a lower surface of the each delivering movable lock plate and an upper surface of the film feeding carrier plate.

In the above described film tearing machine, a positioning notch is disposed on a side of the delivering fixed lock plate close to the delivering movable lock plate; a second position adjustment counter bore is disposed on the film delivering carrier plate, which is just below the positioning notch; a position adjustment block is partially placed in the second position adjustment counter bore, a thickness of which is greater than a depth of the corresponding second position adjustment counter bore; a part of the position adjustment block protruding from the second position adjustment counter bore extends to the positioning notch; and a width of the position adjustment block in the width direction of the film delivering carrier plate is smaller than that of the second position adjustment counter bore in the width direction of the film delivering carrier plate.

The disclosure provides a film tearing method, which uses the above film tearing machine, including following steps.

S1, feeding, laying the release film on the upper surface of the feeding carrier plate, placing a first side of the release film in the first film side gap, and placing a second side opposite to the first side of the release film in the second film side gap;

S2, delivering, moving the film delivering carrier plate close to the feeding carrier plate to undertake the release film flattened in S1; laying the release film on the upper surface of the film delivering carrier plate, placing the first and second sides of the release film in the corresponding film side gaps; fixing the release film on the upper surface of the film delivering carrier plate through the downward negative pressure adsorption hole area disposed thereon; pulling the film delivering carrier plate away from the feeding carrier plate to the preset film tearing position by an external force; and S3, peeling, descending the negative pressure suction nozzles to contact with an upper surface of the release film flatly laid on the film delivering carrier plate to adsorb the release film by an upward negative pressure, and thereby peeling the release film through a lifting sliding block driven by a lifting drive.

After the negative pressure suction nozzles contacting with the release film, the downward negative pressure adsorption force in the S2 is cancelled. In addition, as the downward negative pressure adsorption force is cancelled, the negative pressure suction nozzles make the release film be further flattened, and finally the negative pressure suction nozzles adsorb upward and the downward negative pressure adsorbs downward at the same time to ensure the flatness of the release film.

In the above described S1, before the release film is laid flatly on the upper surface of the feeding carrier plate, the inner movable lock plates (included in the two cantilever-type feeding lock plate assemblies) are folded on the upper surfaces of the corresponding outside fixed lock plates; and after the release film is already laid flatly, the inner movable lock plates are reset, thereby forming the first film side gap and the second film side gap.

In the above described S2, before the release film is undertaken by the film delivering carrier plate, the two delivering movable lock plates are folded on the upper surfaces of the corresponding two delivering fixed lock plates; and after the release film is laid flatly on the upper surface of the film delivering carrier plate, the two delivering movable lock plates are reset to form the above-mentioned film side gaps similarly.

Compared with the related art, advantages of the disclosure are as follows.

Flattening film feeding makes the release film translated flatly, which prevents curling and straining of the release film during translating. The flattening film feeding also ensures transfer efficiency and guarantees the efficiency and quality of the final film tearing.

The film feeding method is set to fix the release film on the preset tearing position. At the same time, the film delivering moves relative to the film feeding, which allows the release film to be suspended and tightened between the film feeding and the film delivering to facilitate a next repeat film feeding cycle and to ensure the accuracy of the subsequent test of the peeling force in the film tearing.

The upward peeling mechanism is provided to further compress the release film before the film tearing, allowing the film to be further flattened to ensure the accuracy of the test of the peeling force.

DESCRIPTION OF REFERENCE NUMERALS

1—film tearing flattening feeding mechanism; 10—feeding carrier plate; 100—first position adjustment counter bore; 11—cantilever-type feeding lock plate assembly; 110—outside fixed lock plate; 111—inner movable lock plate; 112—hinge piece; 113—first urea resin glue plate; 114—position limiting through hole; 115—position adjustment limiting block; 116—bar hole; 117—fastened bolt; 118—placing slot; 12—clump weight;

2—film delivering mechanism; 20—film delivering carrier plate; 200—pointed corner; 201—downward negative pressure adsorption hole area; 2010—adsorption blind hole; 2011—adsorption hole; 2012—main supply hole; 202—second position adjustment counter bore; 203—position adjustment block; 204—connecting plate; 2040—second transverse reinforcing rod; 205—limiting rod; 21—delivering fixed lock plate; 210—positioning notch; 212—kidney-shaped hole; 213—locking fastener; 22—delivering movable lock plate; 23—second urea resin glue plate;

3—upward peeling mechanism; 30—lifting block; 31—suction nozzle connecting seat; 32—negative pressure suction nozzle; 33—operating rod; 34—fixed block; 35—notch groove; 36—eccentric cam;

4—bottom plate; 40—vertical plate; 400—front limiting block; 401—buffer; 402—transversely set vertical plate; 403—first transverse reinforcing rod; 5—winding mechanism; 50—winding roller; 51—ratch wheel; 52—ratchet seat; 53—ratchet.

DETAILED DESCRIPTION OF EMBODIMENTS

Embodiments of the disclosure are shown as follows with a combination of attached drawings, and technical solutions of the disclosure are further described according to the embodiments. However, the disclosure is not limited by the described embodiments.

Embodiment 1

Figure 4:
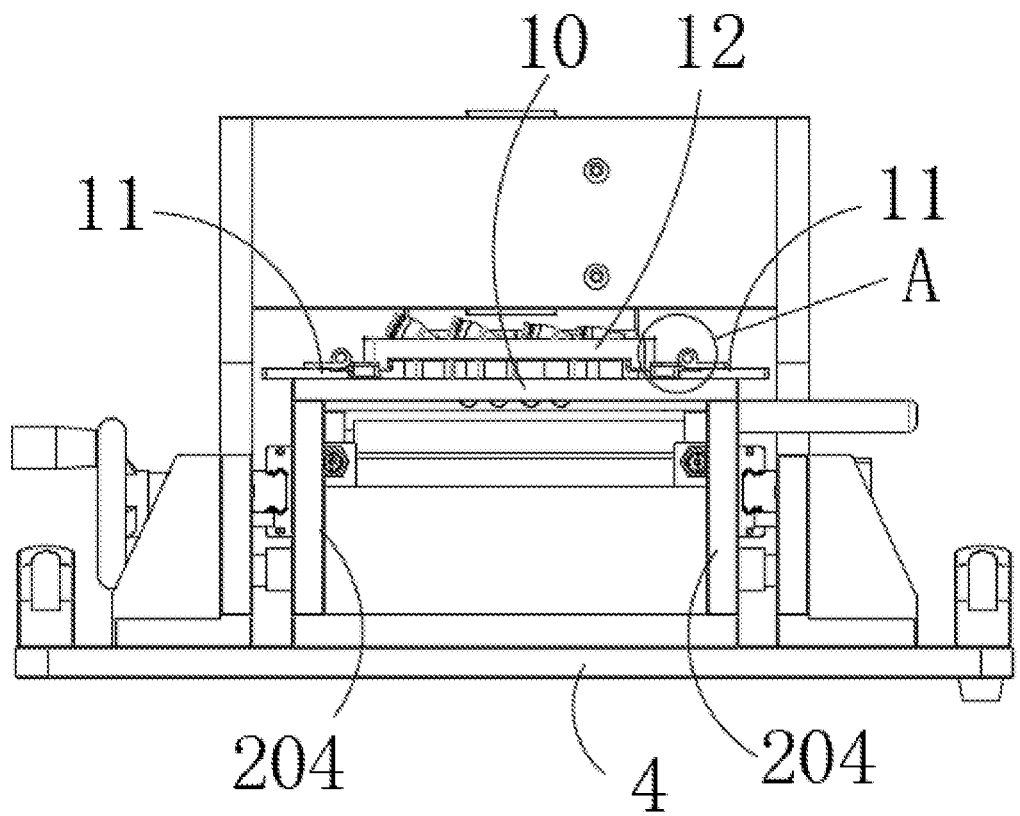
FIG. 4 is a schematic structural diagram of a feeding side of the film tearing machine in a front view according to an embodiment of the disclosure.

As shown in FIG. 4, the embodiment 1 provides a film tearing machine, used for peeling a release film.

Figure 3:
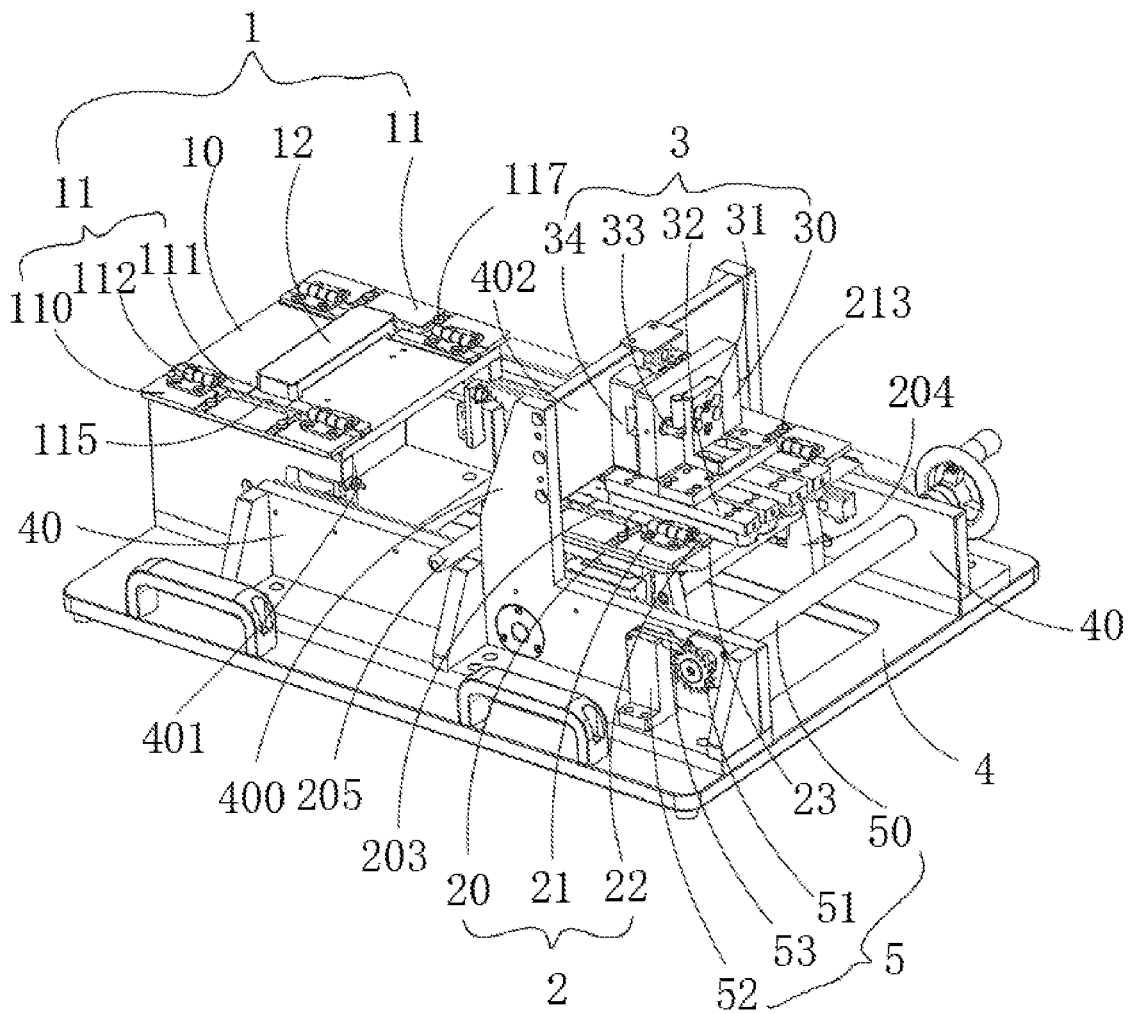
FIG. 3 is a schematic structural diagram of the film tearing machine in a second three-dimensional angle according to the embodiment of the disclosure.
Figure 5:
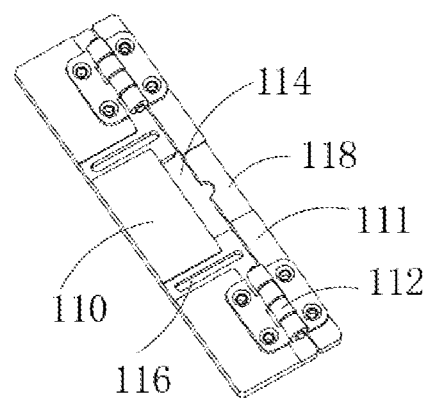
FIG. 5 is a schematic structural diagram of a cantilever-type feeding lock plate assembly according to an embodiment of the disclosure.

As shown in FIGS. 3-5, the film tearing machine includes a film tearing flattening feeding mechanism 1 and a film delivering mechanism 2. The film tearing flattening feeding mechanism 1 is disposed on a bottom plate 4, and the film delivering mechanism 2 is horizontally and slidably connected to the bottom plate 4, namely that the film delivering mechanism 2 is capable of moving back and forth relative to the film tearing flattening feeding mechanism 1.

The film tearing flattening feeding mechanism 1 includes a feeding carrier plate 10, two cantilever-type feeding lock plate assemblies 11 and a clump weight 12.

The feeding carrier plate 10 is fixed horizontally. For example, the feeding carrier plate 10 is fixed on the bottom plate 4 by a fixed support frame, so that the feeding carrier plate 10 is capable of moving together with the bottom plate 4. In addition, the feeding carrier plate 10 and the fixed support frame are fixed through bolts and other fixed components.

As shown in FIGS. 3-5, there are two cantilever-type feeding lock plate assemblies 11, in an illustrated embodiment of the disclosure, an outside lower surface of one of the two cantilever-type feeding lock plate assemblies 11 is disposed on a side in a width direction of an upper surface of the feeding carrier plate 10; a first film side gap is defined between an inner lower surface of the one cantilever-type feeding lock plate assembly 11 and the upper surface of the feeding carrier plate 10; and an outside lower surface of the other of the two cantilever-type feeding lock plate assemblies 11 is disposed on another side in the width direction of the upper surface of the feeding carrier plate 10; a second film side gap is defined between an inner lower surface of the other cantilever-type feeding lock plate assembly 11 and the upper surface of the feeding carrier plate 10. The first and second film side gaps are symmetrically distributed. Therefore, the first side in the width direction of the unpeeled release film enters the first film side gap and the second side in the width direction opposite to the first side of the unpeeled release film enters the second film side gap. The above compressing method enables the release film translated flatly, which ensures the accuracy of the subsequent test of peeling force.

The cantilever-type design is capable of reducing a volume of occupied space in a vertical height direction, making the overall structure of the film tearing machine more compact.

The clump weight 12 is placed transversely above the upper surface of the feeding plate 10 and two ends of the clump weight 12 are placed on the upper surfaces of the suspended sides of the two cantilever-type feeding lock plate assemblies 11.

The clump weight 12 is capable of pressing the suspended sides of the two cantilever-type feeding lock plate assemblies 11 downward to prevent an upward expansion phenomenon of the suspended sides of the two cantilever-type feeding lock plate assemblies 11 due to delivering the release film, namely to prevent two inner openings of the first film side gap and the second film side gap enlarging, which affects the final flat delivering.

In order not to interfere the feeding and the delivering, a shape of the clump weight 12 of the embodiment is an inverted U-shape.

In an illustrated embodiment of the disclosure, each of the two cantilever-type feeding lock plate assemblies 11 includes an outside fixed lock plate 110 and an inner movable lock plate 111, with a width of the outside fixed lock plate 110 being greater than that of the inner movable lock plate 111.

As shown in FIGS. 3-5, the outside fixed lock plate 110 and the inner movable lock plate 111 are connected by hinge pieces 112, the outside fixed lock plate 110 is fixed to the corresponding side of the upper surface of the feeding carrier plate 10, the lower surface of the inner movable lock plate 111 and the upper surface of the feeding carrier plate 10 together form the first film side gap or the second film side gap. The inner movable lock plate 111 can be flipped upward 180° relative to the outside fixed lock plate 110 when the inner movable lock plate 111 form a flattened state, which facilitates placing the untested release film. Namely, the inner movable lock plate 111 is not flattened when the unpeeled release film is placed on the feeding carrier plate 10, for example, the inner movable lock plate 111 is folded on the outside fixed lock plate 110, which facilitates placing the release film and improves the film placement efficiency.

The two ends of the clump weight 12 are placed on the upper surfaces of the corresponding two inner movable lock plates 111 when the inner movable lock plates 111 are flattened. Due to a weight of the clump weight itself, the weight will make the inner movable lock plates 111 difficult to flip relative to the outside fixed lock plates 110. The clump weight 12 can be fixed on the upper surfaces of the inner movable lock plates 111 through fasteners when the inner movable lock plates 111 are flattened, which ensures a stable use.

In an illustrated embodiment of the disclosure, when the inner movable lock plate 111 is flattened, a middle position of the upper surface of the inner movable lock plate 111 is provided with a placing slot 118, and each of the two ends of the clump weight 12 is correspondingly placed in the placing slot 118. Equally, the number of the placing slot is two, corresponding to the two ends of the clump weight 12.

In an illustrated embodiment of the disclosure, the first film side gap and the second film side gap of the embodiment are both unequal distance gaps. For example, the gaps are counterclockwise or clockwise 90° V-shaped gaps with two V-shaped gap openings facing each other, and secondly, the lower surface of the inner movable lock plate 111 is inclined when the inner movable lock plate 111 is flattened relative to the outside fixed lock plate 110, and the inclined surface and the upper surface of the feeding carrier plate 10 form a V-shaped gap with a certain angle.

When the inner movable lock plate 111 is turned upward relative to the outside fixed lock plate 110, the first film side gap and the second film side gap disappear. Similarly, when the inner movable lock plate 111 is flattened or tends to be flattened, the first film side gap and the second film side gap are again formed.

In an illustrated embodiment of the disclosure, as shown in FIGS. 3-5, the hinge pieces 112 of the embodiment is a hinge or hinge chains, for example, a Mismi hinge. The outside fixed lock plate 110 and the inner movable lock plate 111 are connected by two hinge pieces 112; and the inner movable lock plate 111 is flipped to be flattened relative to the outer fixed lock plate 110 or folded on the upper surface of the outside fixed lock plate 110. The two hinges can ensure the smoothness of the inner movable lock plate 111, and the two hinges can also ensure the relative stability of the inner movable lock plate 111 when it is flattened to prevent the inner movable lock plate 111 shaking or swing.

Figure 6:
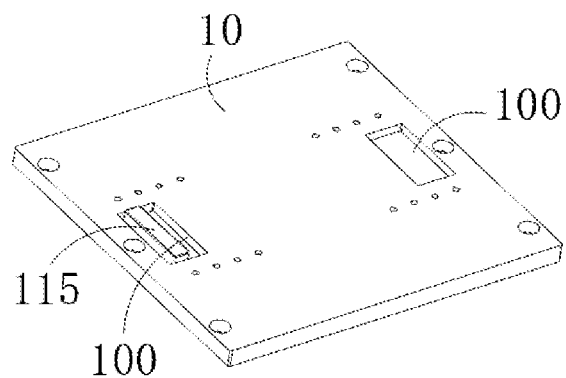
FIG. 6 is a schematic structural diagram of a feeding carrier plate according to an embodiment of the disclosure.
Figure 7:
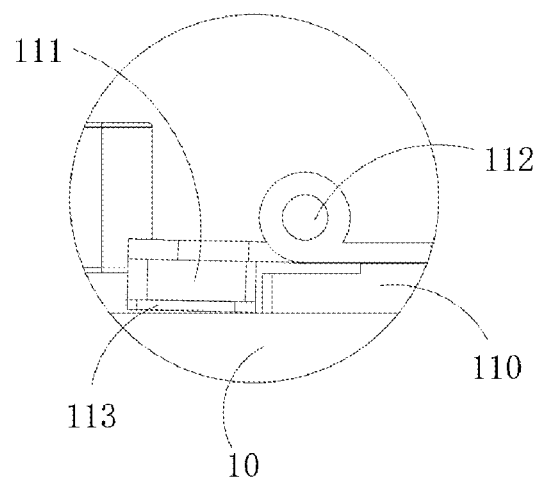
FIG. 7 is a schematic enlarged structural diagram of an A part in FIG. 4.
Figure 8:
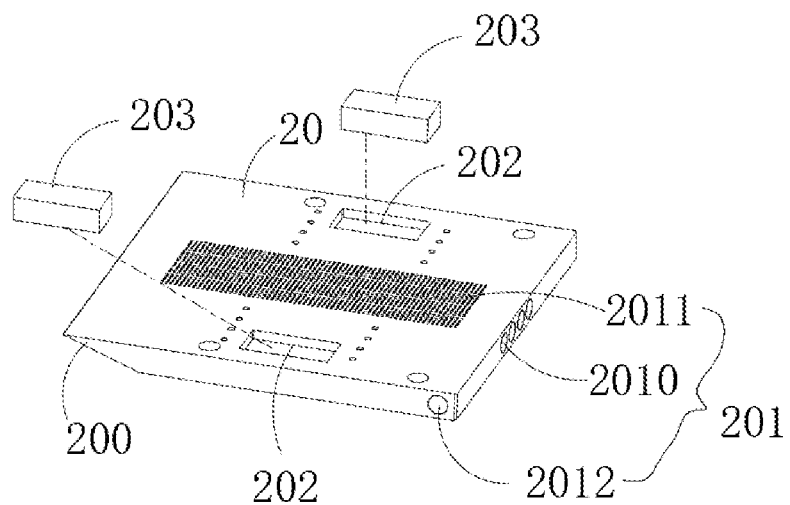
FIG. 8 is a schematic structural diagram of a film delivering carrier plate according to an embodiment of the disclosure.
Figure 9:
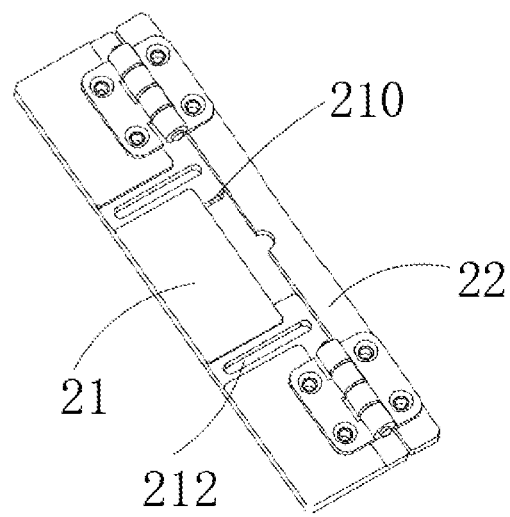
FIG. 9 is a schematic structural diagram of a connection state of a delivering fixed lock plate and a delivering movable lock plate according to an embodiment of the disclosure.

In an illustrated embodiment of the disclosure, as shown in FIGS. 5-7, when the inner movable lock plate 111 is flattened, the lower surface of the inner movable lock plate 111 is provided with a first urea resin glue plate 113, which possesses a certain cushioning performance and a good structural strength. The first urea resin glue plate 113 not only protects the release film (because the surface of the first urea resin glue plate 113 is smooth to prevent the release film knocking), but also strengthens the structure of the inner movable lock plate 111. Furthermore, the above mentioned first film side gap and the second film side gap are formed between the first urea resin glue plate 113 and the feeding carrier plate 10.

The first urea resin glue plate 113 is fixed to the inner movable lock plate 111 by screws or adhesive. To prevent interference, a periphery of the inner movable lock plate 111 is flush with that of the first urea resin glue plate 113.

In an illustrated embodiment of the disclosure, a position limiting through hole 114 is defined between opposite sides of the outside fixed lock plate 110 and the inner movable lock plate 111 when it is flattened; a first position adjustment counter bore 100 (as shown in FIG. 6, the number of the first position adjustment counter bore 100 is two corresponding to the two cantilever-type feeding lock plate assemblies 11) is disposed on the upper surface of the feeding carrier 10 just below the position limiting through hole 114; a size of the first position adjustment counter bore 100 in the width direction of the feeding carrier plate 10 is larger than that of the position limiting through hole 114. A position adjustment limiting block 115 (similarly, a number of the position adjustment liming block is two corresponding to the two first position adjustment counter bores 100) is installed in the first position adjustment counter bore 100 and the position adjustment limiting block 115 extends upward into the position limiting through hole 114. In addition, the position adjustment limiting block 115 is capable of moving relative to the first position adjustment counter bore 100 in the width direction of the feeding carrier plate 10 so as to achieve the purpose of position adjustment.

In an illustrated embodiment of the disclosure, the first position adjustment counter bore 100 is a rectangular counter bore; the position limiting through hole 114 is a rectangular through hole; the position adjustment limiting block 115 is rectangular; the position adjustment limiting block 115 matches with the position limiting through hole 114, is partially placed in the first position adjustment counter bore 100, and also capable of moving in the width direction of the first position adjustment counter bore 100.

The two first position adjustment counter bores 100, the two position adjustment limiting blocks 115 and the two position limiting through holes 114 cooperate with each other to ensure that the two outside fixed lock plates 110 are parallel to each other, which then allows the two inner movable lock plates 111 to be parallel to each other when they are flipped to be flattened, avoiding the outside fixed lock plates 110 in contact with the corresponding sides of the release film during feeding the release film to result in transport jams affecting the accuracy of the final test results.

At the same time, the above descriptions can also ensure a consistency of the first film side gap and the second film side gap in the direction of delivering the release film, so as to avoid distortion and misalignment of the inner movable lock plates 111, which may affect delivering the release film and even knocking the release film.

A matching method between the first position adjustment counter bore 100 and the position adjustment limiting block 115 is a tiny gap match to ensure accuracy.

In an illustrated embodiment of the disclosure, as shown in FIG. 3 and FIG. 5, two position adjustment fastening structures are respectively provided between the outside fixed lock plates 110 and the feeding carrier plate 10 for adjusting the distance between the two inner movable lock plates 111. Each of the two position adjustment fastening structures includes a plurality of mutually parallel bar holes 116 disposed on the outside fixed lock plate 110; a plurality of fastened bolts 117 correspond to the bar holes respectively, and each of the fastened bolts 117 is threaded in the corresponding bar hole 116; and a plurality of threaded holes disposed on the feeding carrier plate 10 correspond to the bar holes 116 respectively, and the fastened bolts 117 are threaded with the threaded holes so that the outside fixed lock plate 110 is fixed relative to the feeding carrier plate 10 after adjusting the position.

When using the position adjustment limiting block 115 for precise pre-positioning, and then the fastened bolts 117 lock on the corresponding bar holes 116, so that the outside fixed lock plate 110 is firmly fixed on the feeding carrier plate 10.

In addition, the above described structures can also adjust the distance between the two cantilever-type feeding lock plate assemblies 11 according to the width of the release film to improve versatility of the feeding with a more reasonable design.

As shown in FIG. 1 and FIGS. 3-7, a principle of the embodiment is as follows.

Flipping the two inner movable lock plates 111 upward relative to the two outside fixed lock plates 110.

Placing the release film on the upper surface of the feeding carrier 10; at the same time, the distance between the two outside fixed lock plates 110 facing towards each other is greater than the width of the release film, preventing the release film from arching or bulging.

Then the two inner movable lock plates 111 are turned downward relative to the two outside fixed lock plates 110 and tend to be flattened or being flattened, at which the two first urea resin glue plate 113 disposed on the lower surfaces of the inner movable lock plates 111 form two small gaps with the release film or are slightly pressed against the upper surface of the release film.

The clump weight 12 is placed transversely above the release film and the two ends of the clump weight 12 are placed on the two corresponding placing slots 118 to complete preparation of the feeding.

The above feeding method can ensure the flatness of the feeding and the greater versatility of the feeding mechanism to reduce testing cost for different widths of release films.

In an illustrated embodiment of the disclosure, the film delivering mechanism 2 of the embodiment is a downward negative pressure adsorption-type film delivering mechanism, while the upward peeling mechanism 3 is an upward negative pressure adsorption-type upward peeling mechanism, namely that the two negative pressures are opposite to each other.

In the illustrated embodiment of the disclosure, the film delivering mechanism 2 and the bottom plate 4 are connected by horizontal sliding connection, and the upward peeling mechanism is located above the side of the film delivering mechanism 2 which is not moved into the certain position. However, when the film delivering mechanism 2 is moved into the certain position, the upward peeling mechanism is located directly above the film delivering mechanism 2. The film delivering mechanism 2 is pulled by a horizontal force, and the release film adsorbed by the film delivering mechanism 2 is pushed to the direct bottom of the upward peeling mechanism 3, at the same time, the upward negative pressure is used for peeling the release film.

In an illustrated embodiment of the disclosure, as shown in FIG. 3, the film delivering mechanism 2 of includes a film delivering carrier plate 20 horizontally slidably connected to the bottom plate 4, the film delivering carrier plate 20 and the feeding carrier plate 10 are located on the same horizontal plane and the feeding carrier plate 10 and the film delivering carrier plate 20 are distributed sequentially according to the feeding direction. Namely, the upper surface of the feeding carrier plate 10 and the upper surface of the film delivering carrier plate 20 are on the same horizontal plane.

As shown in FIG. 3 and FIGS. 8-11, a pointed corner 200 is disposed on a side of the film delivering carrier plate 20 away from the feeding carrier plate 10, which facilitates the peeling of the release film. In an illustrated embodiment of the disclosure, the side of the film delivering carrier plate 20 far away from the feeding carrier plate 10 is provided with an inclined surface, and the inclined surface is tilted from top to bottom tending toward the side of the feeding carrier plate 10 to form the above mentioned pointed corner 200.

The release film enters from the feeding carrier plate 10 and is translated onto the film delivering carrier plate 20, which is provided with the downward negative pressure adsorption hole area 201 in the middle position along the feeding direction; the downward negative pressure adsorption hole area is connected to a downward negative pressure source, when the downward negative pressure source works, the downward negative pressure adsorption hole area 201 adsorbs the lower surface of the release film; and there are two delivering fixed lock plates 21 disposed on two sides of the upper surface of the film delivering carrier plate 20, the two delivering fixed lock plates 21 are disposed on the same horizontal plane and parallel to each other. There is a delivering movable lock plate 22 hinged on the inner side of each of the two delivering fixed lock plates 21, and the delivering movable lock plate 22 is capable of being turned upward and folded on the upper surface of the delivering fixed lock plate 21, and the delivering movable lock plate 22 is also capable of being turned down to form a flattened state leveling to the corresponding delivering fixed lock plate 21; and a film side gap is defined between a lower surface of the each delivering movable lock plate 22 and an upper surface of the film delivering carrier plate 20. Namely, the first side of the release film enters the first film side gap and the second side opposite to the first side of the release film enters the second film side gap, which aims to press both sides of the release film flatly before peeling the release film and to make the release film flatly laid directly below the upward peeling mechanism 3.

The two delivering fixed lock plate 21 and the two delivering movable lock plates 22 are connected by hinges or hinge chains, and the delivering movable lock plate 22 is capable of moving within a certain flipping angle relative to the delivering fixed lock plate 21, as long as the delivering movable lock plate 22 is turned down from the folded state to the tending flattened state or in the flattened state.

Secondly, the distance between the two delivering fixed lock plates 21 is greater than the width of the release film to prevent unevenness of the release film due to the sides of the release film in contact with the inner sides of the two delivering fixed lock plates 21.

In the embodiment, the delivering movable lock plates 22 tends to be flattened or is in the flattened state under its own gravity to form a flattening restriction on the release film.

In addition, the lower surface of each of the two delivering movable lock plates 22 tending to be flattened or in the flattened state is provided with a second urea resin glue plate 23, and the second urea resin glue plate 23 and the upper surface of the film delivering carrier plate 20 together form the film side gap described above.

As shown in FIG. 3 and FIGS. 8-11, a positioning notch 210 is provided on a side of the delivering fixed lock plate 21 close to the delivering movable lock plate 22, a second position adjustment counter bore 202 is provided on the film delivering carrier plate 20 just below the positioning notch 210, and a position adjustment block 203 is partially placed in the second position adjustment counter bore 202, the thickness of the position adjustment block 203 is greater than the depth of the second position adjustment counter bore 202. The other part of the position adjustment block 203 protruding from the second position adjustment counter bore 202 extends to the positioning notch 210, and the width of the position adjustment block 203 in the width direction of the film delivering carrier plate 20 is smaller than that of the second position adjustment counter bore 202 in the width direction of the film delivering carrier plate 20, which enables the position adjustment block 203 to move in the second position adjustment counter bore 202 along the width direction of the film delivering carrier plate 20. The position of the delivering fixed lock plate 21 on the film delivering carrier plate 20 can be adjusted, namely that the distance between the two delivering movable lock plates 22 can be adjusted to accommodate different widths of the release films.

Secondly, each of the delivering fixed lock plates 21 is provided with a plurality of kidney-shaped holes 212 along the width of the delivering fixed lock plate 21 and locking fasteners 213 penetrated in the kidney-shaped holes 212. A plurality of threaded holes are located below the kidney-shaped holes 212 and disposed on the film delivering carrier plate 20. Furthermore, the locking fasteners 213 and the threaded holes are threaded together so that when the locking fasteners 213 are loosened, the position of the delivering fixed lock plate 21 on the film delivering carrier plate 20 can be adjusted. For example, the locking fasteners 213 are made of bolts, screws and other metal components.

The first and second sides of the release film are limited by an assembly of the delivering fixed lock plate 21 and the delivering movable lock plate 22 while the release film is located at the preset peeling position, and a center position along the length direction of the release film is fixed by the downward negative pressure adsorption hole area 201, which together makes the release film flattened. Therefore, when the test of the peeling force is conducted, the upward peeling mechanism 3 adsorbs the upper surface of the release film located between the two delivering movable lock plates 22. Since there is a tiny gap between the upward peeling mechanism 3 and the release film, or the upward peeling mechanism 3 is connected to the lifting drive, making the upward peeling mechanism 3 contact the release film downward and rise upward with the release film, the above two methods can achieve the peeling test of the release film to test the peeling force.

Secondly, the downward negative pressure adsorption hole area 201 includes at least one adsorption blind hole 2010 provided inside the film delivering carrier plate 20 along the feeding direction, and a plurality of adsorption holes 2011 are provided on the upper surface of the film delivering carrier plate 20 threaded to the at least one adsorption blind hole 2010, and the adsorption holes 2011 are distributed in an array.

In an illustrated embodiment of the disclosure, a number of the blind adsorption hole 2010 is 1-4 and they are distributed parallel to each other. There are two distributed ways, firstly, the blind adsorption holes 2010 are connected in parallel and connected to a main supply hole 2012 (the blind adsorption holes 2010 are enclosed), the main supply hole 2012 is a blind hole, and the downward negative pressure source is connected to the main supply hole 2012. Secondly, it is also possible to connect each the blind adsorption holes 2010 with the downward negative pressure source, which can also achieve negative pressure supply.

A shape of the absorption blind holes 2010 are round, which is easy to drill and manufacture.

In the embodiment, the downward adsorption of the release film is done in the middle area of the film delivering carrier plate 20, and then the two film side gaps formed between the delivering fixed lock plates 21 and the delivering movable lock plates 22 are used for flattening the release film. Namely, when the adsorption holes 2011 absorb the release film downward, due to the middle area of the lower surface of the release film and the upper surface of the film delivering carrier plate 20 are in a state of compliance, the first and second sides of the release film are flattened outward under the action of the negative pressure of adsorption in cooperation with the two film side gaps to ensure that the release film is flattened before peeling to accurately detect the peeling force of the release film.

In an illustrated embodiment of the disclosure, there are two vertical plates 40 on both sides of the upper surface of the bottom plate 4, and the two vertical plates 40 are parallel to each other, and there are two connecting plates 204 located between the two vertical plates 40 on the lower surface of the film delivering carrier plate 20, and one of the two connecting plates 204 is horizontally slidingly connected to the inner surface of one of the two vertical plates 40, and the other connecting plate 204 is horizontally slidingly connected to the inner surface of the other vertical plate 40.

The horizontal sliding connection above is realized by a combination of a slide rail and sliding blocks.

Figure 1:
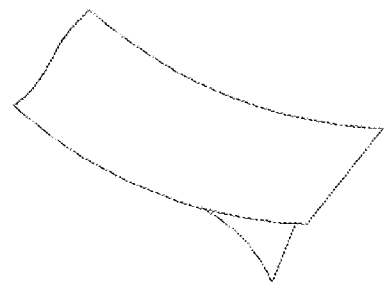
FIG. 1 is a schematic diagram of a tear-off state of a release film according to an embodiment of the disclosure.
Figure 2:
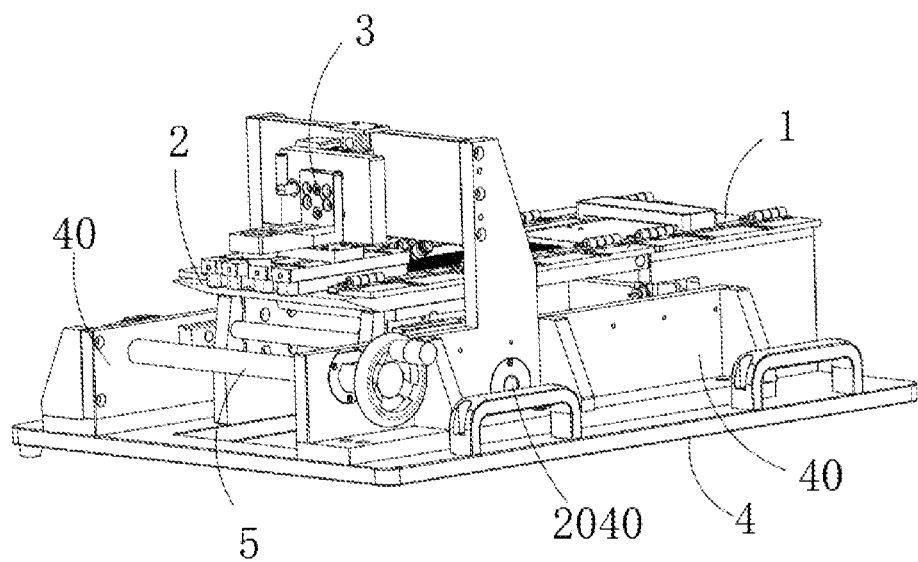
FIG. 2 is a schematic structural diagram of a film tearing machine in a first three-dimensional angle according to an embodiment of the disclosure.

As shown in FIG. 2, in order to enable the film delivering carrier plate 20 to move into the preset position, a carrier plate movement limiting structure is provided, in an embodiment of the disclosure, the carrier plate movement limiting structure includes a front limiting block 400 set at the top side of the central position of each the vertical plates 40, a limiting rod 205 disposed on each side of the end of the film delivering carrier plate 20 close to the feeding carrier plate 10. When the film delivering carrier plate 20 is moved relative to the bottom plate 4 and is directly below the peeling mechanism 3, the limiting rod 205 is in contact with the rear side of the respective front limiting block 400, which means that the film delivering carrier plate 20 moves into the preset position and the film tearing test can be started. When the film delivering carrier plate 20 returns to its original position, there are two buffers 401 located under the feeding carrier plate 10 on the bottom plate 4 or the vertical plates 40, and the two buffers 401 are parallel to each other. The reset of the film delivering carrier plate 20 to contact the buffers 401 indicates that the film delivering carrier plate 20 is in the right position and the next performance of another release film feeding on the feeding carrier plate 10 can be performed. The control of the movement allows the film delivering carrier plate 20 to be in the most accurate position for feeding and reaching the preset peeling position.

When the film delivering mechanism 2 moves to the side of the film tearing flattening feeding mechanism 1, the flattened release film enters the film delivering mechanism 2, and the two delivering movable lock plates 22 are folded on the upper surfaces of the corresponding delivering fixed lock plates 21 to facilitate the entry of the release film. However, after the release film enters the preset position of the film delivering carrier plate 20 (namely, the front side of the release film does not exceed the side of the pointed corner 200 on the film delivering carrier plate 20 away from the feeding carrier plate 10), the two delivering movable lock plates 22 are flipped downward so that the two film side gaps are formed between the two delivering movable lock plates 22 and the film delivering carrier plate 20; the first and second sides of the release film are therefore placed in the corresponding two film side gaps. Through the downward negative pressure, the middle area of the release film (along the length direction of the release film) is fixed by the absorption of the film delivering carrier plate 20. In the above fixing process, the downward negative pressure causes the release film to adhere to the upper surface of the film delivering carrier plate 20; and the release film is absorbed by the negative pressure adsorption from its middle area causes the surface without the negative pressure absorption to be flattened, which cooperate with the two gaps to make the release film to be completely flattened.

Figure 10:
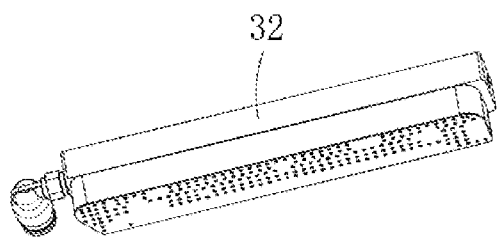
FIG. 10 is a schematic structural diagram of a negative pressure suction nozzle according to an embodiment of the disclosure.

As shown in FIG. 3 and FIG. 10, the film tearing machine further includes: the upward peeling mechanism 3 slidably connected to the bottom plate 4 in the vertical direction, and a winding mechanism 5.

For example, the upward peeling mechanism 3 is set with multiple levels of negative pressure for peeling force testing of the different release films, as well as unfamiliar release films. However, top sides of the two front limiting blocks 400 are connected with a transversely set vertical plate 402, which facilitates the overall structure of the film tearing machine more compact, while facilitating the installation and removal of different upward peeling mechanism 3 for replacement.

In an illustrated embodiment of the disclosure, as shown in FIG. 3 and FIG. 10, the upward peeling mechanism 3 includes a lifting block 30 vertically slidingly connected to the transversely set vertical plate 402, a suction nozzle connecting seat 31 attached to the lifting block 30, and negative pressure suction nozzles 32 attached to the suction nozzle connecting seat 31. The negative pressure suction nozzles 32 of the embodiment are horizontally distributed or longitudinally distributed.

After the negative pressure nozzles 32 descend to contact with the release film, the gravity of the negative pressure suction nozzles 32 allows the release film to be further flattened, thus ensuring the accuracy of testing the peeling force.

A number of the negative pressure suction nozzles 32 of the embodiment is 1-4, for example, in the length direction of the release film, there are 4 negative pressure suction nozzles 32 and they are distributed along the length width of the release film from left to right. While in the width direction of the release film, there is 1 negative pressure suction nozzle 32 and it is distributed along the width direction of the release film. Of course, the number of the negative pressure suction nozzle 32 can be determined by the type of the release film.

When a number of negative pressure suction nozzles 32 is more than 2, or even more, the negative pressure suction nozzles 32 are distributed in parallel to ensure that the mutual negative pressure does not interfere with each other and to facilitate individual control of the negative pressure to ensure that the negative pressure of each the negative pressure suction nozzle 32 is with the same pressure value.

Figure 11:
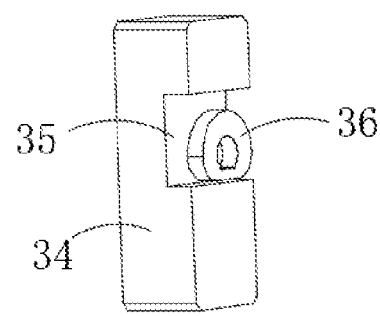
FIG. 11 is a schematic diagram of a state of a cam disposed in a notch groove according to an embodiment of the disclosure.

The lifting drive of the embodiment is an eccentric lifting drive. In an illustrated embodiment of the disclosure, as shown in FIG. 3 and FIG. 11, there is a horizontally set operating rod 33 rotating on the lifting block 30; a fixed block 34 is disposed on a vertical plane of the transversely set vertical plate 402 close to the lifting block 30; a notch groove 35 is opened on the fixed block 34; and the inner end of the operating rod 33 is connected to an eccentric cam 36 located in the notch groove 35. The rotation of the operating rod 33 makes the eccentric cam 36 rotate, and when the eccentric cam 36 is in contact with the lower sidewall of the notch groove 35, the lifting block 30 has an upward driving force to facilitate peeling the release film.

The operating rod 33 can be rotatably connected to the lifting block 30 by bearings or bushings.

And when the eccentric cam 36 is not in contact with the lower sidewall of the notch groove 35, it means that the negative pressure suction nozzle 32 is in the lowest position for the negative pressure adsorption on the release film.

In addition, the winding mechanism 5 of the embodiment is a one-way rotating winding mechanism, in an illustrated embodiment of the disclosure, the winding mechanism 5 includes a winding roller 50 rotatably connected to the two vertical plates 40; one end of the winding roller 50 is extended to an outer surface of one of the two vertical plates 40, the other end of the winding roller 50 is extended to an opposite outer surface of the other one of the two vertical plates 40; a ratch wheel 51 is sleeved on the other end of the winding roller 50; a ratchet seat 52 is provided on the bottom plate 4 or the other one of the two vertical plates 40; ratchets 53 are attached to the ratchet seat 52 to engage with the ratch wheel 51, the ratch wheel 51 and the ratchets 53 cooperate to achieve one-way rotation of the winding roller 50, which realizes the purpose of winding after peeling the release paper.

A handwheel is attached to an end of the winding roller 50 away from the ratch wheel 51. The handwheel rotates the winding roller 50 to achieve a purpose of winding.

The working principle of the embodiment 1 is as follows. The film tearing flattening feeding mechanism 1 is used for the feeding, and the release film is flattened after the feeding. The flattened release film is achieved the peeling by the upward negative pressure of the upward peeling mechanism 3, and the peeling force of the release film can be obtained through different negative pressure settings or detection of the negative pressure value so as to achieve the purpose of testing the finished release film regarding the peeling force.

In addition, there is at least one first transverse reinforcing rod 403 connected between the two vertical plates, and a second transverse reinforcing rod 2040 connected between the two connecting plates 204. The reinforcing rods are designed to enhance the overall structural strength of the film tearing machine, and at the same time, it can also make the connecting plates 204 move more smoothly.

Embodiment 2

The working principle and structure of the embodiment 2 are basically the same as those of the embodiment 1, a difference is that the first film side gap and the second film side gap are equidistant gaps, namely that the lower surfaces of the inner movable lock plates 111 are parallel to the upper surface of the feeding carrier plate 10 when the inner movable lock plates 111 are flattened.

Embodiment 3

Based on the embodiment 1, the embodiment 3 provides a film tearing method including following steps.
- S1, feeding, laying a release film on an upper surface of a feeding carrier plate 10, placing a first side of the release film in a first film side gap, and placing a second side opposite to the first film side gap of the release film in a second film side gap.
- S2, delivering, moving a film delivering carrier plate 20 close to the feeding carrier plate 10 to undertake the release film flattened in S1; laying the release film on an upper surface of the film delivering carrier plate 20, placing two sides of the release film in the corresponding film side gaps; fixing the release film on the upper surface of the film delivering carrier plate 20 through a downward negative pressure adsorption hole area 201 disposed thereon; pulling the film delivering carrier plate 20 away from the feeding carrier plate 10 to a preset film tearing position by an external force, and thereby finishing the delivering.

In the above S1, before laying the release film on the surface of the feeding carrier plate 10, the inner movable lock plates 111 are folded on the surfaces of the outside fixed lock plates 110; after laying the release film, the inner movable lock plates 111 are reset, thereby forming the first film side gap and the second film side gap.

In the above S2, before the film delivering carrier plate 20 undertaking the release film, the delivering movable lock plates 22 are folded on the surfaces of the delivering fixed lock plates 21; after laying the release film on the upper surface of the film delivering carrier plate 20, the delivering movable lock plates 22 are reset to form the above-mentioned first film side gap and the second film side gap similarly.

The above method is able to improve flatness and stability of the release film during feeding the release film, and to ensure the final stability and the test accuracy of the film tearing.
- S3, peeling, descending negative pressure suction nozzles 32 to contact with an upper surface of the release film flatly laid on the film delivering carrier plate 20 and to adsorb the release film by an upward negative pressure, thereby peeling the release film through a lifting sliding block 30 driven by a lifting drive.

After the negative pressure suction nozzles 32 are in contact with the release film, the downward negative pressure adsorption force in the S2 is cancelled, and as the downward negative pressure adsorption force is cancelled, the negative pressure suction nozzles 32 cause the release film to be further flattened. Finally, the negative pressure suction nozzles 32 adsorb upward and the downward negative pressure adsorbs downward simultaneously to adsorb the release film and ensure the flatness of the release film.

The embodiments described herein are merely illustrated embodiments of the disclosure. Those skilled in the related art of the disclosure are able to make various modifications or amendments to the illustrated embodiments described or replace the embodiments in a similar manner, but the above modifications, amendments and replacements do not deviate from the scope of the protection of the disclosure.

What is claimed is:

1. A film tearing machine, comprising a bottom plate thereon, wherein the film tearing machine comprises:
    a film tearing flattening feeding mechanism, disposed on the bottom plate; wherein the film tearing flattening feeding mechanism is configured to output a release film flatly;
    a film delivering mechanism, horizontally and slidably connected to the bottom plate; wherein the film delivering mechanism is configured to undertake and translate the flat release film output by the film tearing flattening feeding mechanism to a preset film tearing position; and
    an upward peeling mechanism, disposed above the preset film tearing position; wherein the upward peeling mechanism is configured to peel the release film upward;
    wherein the film tearing flattening feeding mechanism and the film delivering mechanism are configured to enable the release film to be located on a horizontal plane; and
    wherein the film tearing flattening feeding mechanism comprises:
        a feeding carrier plate, which is fixed horizontally;
        two cantilever-type feeding lock plate assemblies;
        wherein an outside lower surface of one of the two cantilever-type feeding lock plate assemblies is disposed on a side in a width direction of an upper surface of the feeding carrier plate;
    a first film side gap is defined between an inner lower surface of the one cantilever-type feeding lock plate assembly and the upper surface of the feeding carrier plate; and an outside lower surface of the other of the two cantilever-type feeding lock plate assemblies is disposed on another side in the width direction of the upper surface of the feeding carrier plate; a second film side gap is defined between an inner lower surface of the other cantilever-type feeding lock plate assembly and the upper surface of the feeding carrier plate.

2. The film tearing machine according to claim 1, wherein the film delivering mechanism is a downward negative pressure adsorption-type film feeding mechanism and the upward peeling mechanism is an upward negative pressure adsorption-type upward peeling mechanism.

3. The film tearing machine according to claim 1, wherein the film tearing flattening feeding mechanism further comprises:
    a clump weight, transversely disposed above the upper surface of the feeding carrier plate; and
    wherein two ends of the clump weight are disposed on upper surfaces of suspended sides of the two cantilever-type feeding lock plate assemblies.

4. The film tearing machine according to claim 3, wherein each of the two cantilever-type feeding lock plate assemblies comprises:
    an outside fixed lock plate;
    an inner movable lock plate;
    hinge pieces, connected between the outside fixed lock plate and the inner movable lock plate;
    wherein the outside fixed lock plate is fixed on a corresponding side of the upper surface of the feeding carrier plate; one of the first film side gap and the second film side gap is defined between a lower surface of the inner movable lock plate and the upper surface of the feeding carrier plate; and each of the two ends of the clump weight is disposed on a flattened upper surface of the inner movable lock plate.

5. The film tearing machine according to claim 1, wherein the film delivering mechanism comprises:
    a film delivering carrier plate, capable of sliding horizontally;
    a downward negative pressure adsorption hole area, disposed in a middle area of the film delivering carrier plate along a feeding direction;
    two delivering fixed lock plates, correspondingly disposed on two sides of an upper surface of the film delivering carrier plate; wherein the two delivering fixed lock plates are disposed on a same horizontal plane and are parallel to each other;
    two delivering movable lock plates, hinged with inner sides of the two delivering fixed lock plates respectively; wherein each of the two delivering movable lock plates is capable of being turned upward and folded on an upper surface of the corresponding delivering fixed lock plate, and capable of being turned downward to form a flattened state leveling to the corresponding delivering fixed lock plate; and a film side gap is defined between a lower surface of the delivering movable lock plate and an upper surface of the film delivering carrier plate.

6. The film tearing machine according to claim 1, wherein the upward peeling mechanism comprises:
    a lifting sliding block, connected to a lifting drive;
    a suction nozzle connecting seat, connected to the lifting sliding block; and
    negative pressure suction nozzles, connected to the suction nozzle connecting seat.

7. The film tearing machine according to claim 6, wherein the lifting drive comprises:
    an operating rod, rotatably and horizontally disposed in the lifting sliding block;
    a fixed block, disposed on a vertical surface close to the lifting sliding block of a transversely set vertical plate disposed above the bottom plate; wherein the lifting sliding block and the transversely set vertical plate are configured to form a slide connection in a vertical direction;
    a notch groove, disposed on the fixed block;
    an eccentric cam, disposed in the notch groove and connected to an inner end of the operating rod; wherein a rotation of the operating rod is configured to drive the eccentric cam to rotate; and the eccentric cam is in contact with a lower groove-wall of the notch groove to enable the lifting sliding block generate a rising driving force to peel the release film.

8. A film tearing method, implemented by the film tearing machine according to claim 1, comprising:

S1, feeding, laying the release film on the upper surface of the feeding carrier plate, placing a first side of the release film in the first film side gap, and placing a second side opposite to the first side of the release film in the second film side gap;

S2, delivering, moving a film delivering carrier plate close to the feeding carrier plate to undertake the release film flattened in S1; laying the release film on an upper surface of the film delivering carrier plate, placing the first and second sides of the release film in corresponding film side gaps; fixing the release film on the upper surface of the film delivering carrier plate through a downward negative pressure adsorption hole area disposed thereon; pulling the film delivering carrier plate away from the feeding carrier plate to the preset film tearing position by an external force; and S3, peeling, descending negative pressure suction nozzles to contact with an upper surface of the release film flatly laid on the film delivering carrier plate to adsorb the release film by an upward negative pressure, and thereby peeling the release film through a lifting sliding block driven by a lifting drive.

* * * * *